April 21, 1931.    F. K. HAYS ET AL    1,802,015
LEVELING SADDLE
Filed April 28, 1927
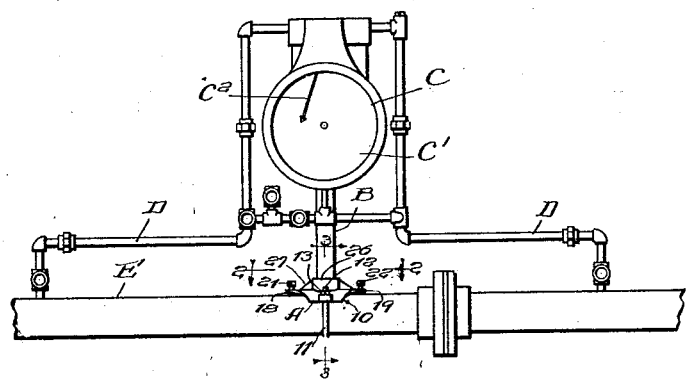
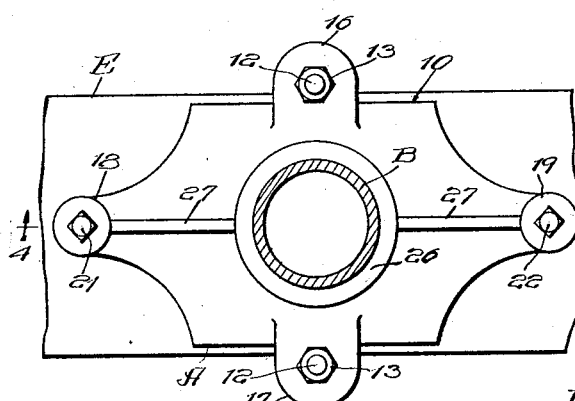
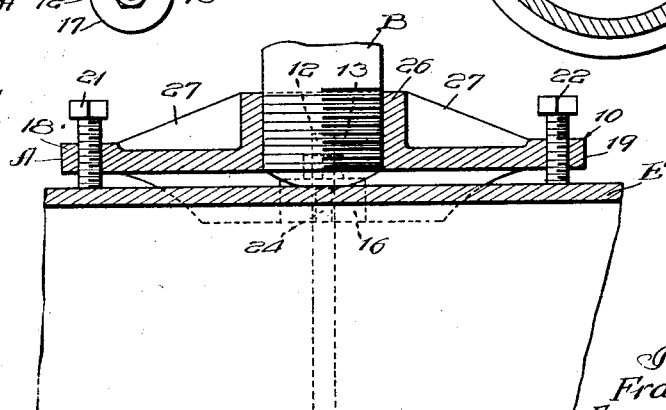
Inventors
Frank K. Hays
Francis A. McMurray Patented Apr. 21, 1931

1,802,015

UNITED STATES PATENT OFFICE

FRANK K. HAYS AND FRANCIS A. McMURRAY, OF CHICAGO, ILLINOIS

LEVELING SADDLE

Application filed April 28, 1927. Serial No. 187,403.

Our invention relates in general to supporting devices and more particularly to a support for recording instruments such as those used in the oil fields, which support we have designated by the term, leveling saddle.

The natural gas which is found in oil producing regions, is a valuable commodity and is often piped long distances for use as fuel in metropolitan areas, or for the recovery of important chemicals, for example helium gas by industrial organizations.

No matter what the use to which the gas is put, it is absolutely necessary for satisfactory operation of the pipe lines, that the rate and volume of flow at many different points be known. The instruments employed are automatic in character and record on suitably prepared paper dials, information which is necessary for the operation of the lines. These instruments are very delicate and in order to secure dependable results, they must be kept absolutely level. Numerous recording instruments of this character must be located in out of the way places and the disadvantage and cost incidental to constructing a building to support and shelter these numerous instruments will readily appear.

The principal object of the present invention is to provide a simplified economical support for a recording instrument.

Another object is to provide a support whereby an instrument may be secured directly to a pipe line.

Another object is to provide a saddle for application to a pipe line, having as an integral part thereof, means for adjusting its position with respect to the pipe.

Other objects and features of the invention will become apparent from the consideration of the following detailed description taken with the accompanying drawings, wherein—

Fig. 1 illustrates the application of our leveling saddle to suport a recording instrument adjacent to a pipe line.

Fig. 2 is a sectional view along the line 2—2 of Fig. 1, showing the leveling saddle in plan.

Fig. 3 is a sectional view along the line 3—3 of Fig. 1, and

Fig. 4 is a sectional view along the line 4—4 of Fig. 2.

Before proceeding with the detailed description, it must be recalled that pipe lines of this character in oil producing regions are generally laid above the ground. The level saddle therefore supporting the instrument and all appurtences thereto, can readily be placed in position with practically no inconvenience.

Referring now to the drawings, the saddle designated generally by the reference character A, is adapted to support a standard B, to the top of which a meter C is suitably secured. Piping D is in communication with a large pipe line E on which the saddle is secured and this small piping transmits the fluid in the pipe E to the meter C.

The arrangement shown in Fig. 1 is the conventional arrangement now employed with our leveling saddle to secure meters of the class known as orifice meters adjacent a pipe line. The particular arrangement of lead pipes D is of no importance where the present invention is concerned. The orifice meter C is of an automatic recording type and is provided with a removable paper dial C' which revolves and is marked by a recording lever $C^2$. To secure good results with a meter of this type, it must be maintained absolutely level. The leveling saddle illustrated in detail in Figs. 2 to 4 is adapted to secure this result in an efficient, economical manner.

The saddle comprises a saddle body 10, with a strap 11 having threaded ends 12 for receiving nuts 13 which hold the saddle body in a fixed position in relationship to the strap 11. The saddle body is conformed to fit over the top of the large pipe E and is held tightly thereon by the strap 11. Its general conformation when viewed from above, is that of a four pointed spider, having side or traverse projections 16 and 17 and longitudinal projections 18 and 19. The side extensions are provided with unthreaded apertures through which the ends of the strap 11 project, while the projections 18 and 19 have threaded apertures adapted to receive adjustable screws which in the drawings are shown as cap-screws 21 and 22. These cap screws are made to cooperate with a pair of medial projections 23 and 24 (Fig. 3) which partake of the nature of a transverse medial rib which supports the saddle body away from the pipe E and permits it to rock back and forth as on a fulcrum. The inclination or position of the saddle body longitudinally with respect to the pipe E, is controlled by operating the cap screws 21 and 22.

The center of the saddle is provided with an upstanding circular projection 26 which has an interior thread for the reception of the standard B on the top of which the meter C is secured.

The saddle body is made in any suitable manner, but we have found that a cast structure gives us very good results. When the saddle body is made in this way, we provide strengthening ribs 27 between the longitudinal projections 18 and 19 and the vertical projection 26.

When applying the leveling saddle preparatory to mounting a meter thereon, the standard B or any other suitable member, for example a length of pipe of the proper diameter, is secured to project vertically from the saddle. The saddle is then placed on the large pipe E and the strap secured loosely around such pipe. The standard is then held as vertical as possible while the nuts 13 are pulled up tight. The saddle is then adjusted longitudinally by the operating the cap screws 21 and 22. Looking at Fig. 4, if the standard B were found to incline to the right, cap screw 21 would be loosened slightly and cap screw 22 tightened.

When the saddle is substantially level, the meter can be mounted thereon and after the installation is complete, the assembly can be checked to be sure that the meter is level. If not, it can again be levelled in either direction since a slight inclination to the side can be adjusted by tightening the proper bolt 13. The arrangement of the strap about the pipe therefore, not only serves to secure the saddle in place but also functions as part of the leveling apparatus.

If at any time after a meter is put in use, it is found to be out of alignment due to a slight movement of the large pipe E or to an accidental cause of any kind, the adjustment on the saddle can be resorted to realign the meter without delay, and without removing the meter.

The advantage of employing a construction such as that which we have shown, over the only other satisfactory construction, namely that of a substantial building, is obvious. The only building of any kind that is necessary at any time, when our leveling saddle is in use, is a small wooden or similar frame to protect the instrument from the elements. This need cover only the instrument proper, and can readily be removed or adjusted to furnish access to the meter for changing dials or the like.

We have shown a very specific use of our leveling saddle, and to promote clearness, have described it in detail. But it is obvious that we need not limit ourselves to the specific use and construction shown, and the invention therefor, is limited only by the scope of the appended claims.

What we claim as new and desire to secure by United States Letters Patent is:

1. A leveling saddle comprising a saddle body adapted to fit over a relatively large pipe and conforming generally to the shape thereof, said body having four extensions, two transversely and two longitudinally disposed and each having an aperture therein, a strap for fitting around the pipe, its ends inserted in the apertures in the transverse extensions, and secured to the saddle body with nuts, a medial transverse rib on the under side of the saddle body in contact with the pipe, and screws in the longitudinal apertures for tilting the saddle body about said rib to change its angle of inclination with respect to the pipe.

2. In a leveling saddle adapted to be secured to a pipe line and support a recording instrument, a saddle body conforming generally to the shape of the pipe on which it is adapted to be placed, an integral projection on the saddle and adapted to come in contact with the pipe, on which the saddle body is adapted to rock, and means for rocking the saddle on said integral projection to adjust it to a level position and hold it in such position.

3. In a leveling saddle for supporting an instrument on a pipe line, a saddle body adapted to set on the pipe, a downward projection on the saddle body on which it is adapted to rock, and means for rocking the saddle body about said projection to bring it to a level position and hold it in such position.

4. A leveling saddle for supporting an instrument adjacent a pipe line, comprising a saddle body having centrally disposed vertical means for supporting a standard on which the instrument is placed, a strap extending around the pipe line and having adjustable means at each end for securing it to the sides of the saddle body and means for adjusting the saddle body longitudinally to change the angle which it makes with the pipe line.

5. A leveling saddle for supporting an instrument adjacent a pipe line, comprising a saddle body, a strap adapted to extend around the pipe line and having adjustable means at each end for securing it to the saddle body, and means for adjusting the saddle body longitudinally tiltably with respect to the pipe line to change the angle which the saddle makes therewith, said adjusting means including a transverse rib at the approximate center of the saddle body for contacting with the pipe line, and screws at the ends of the saddle for rocking the saddle about said rib as a fulcrum point, and maintaining the saddle in a selected position.

In witness whereof, we hereunto subscribe our names this 20th day of April, 1927.

FRANK K. HAYS.
FRANCIS A. McMURRAY.